United States Patent [19]

Ogawa et al.

[11] Patent Number: 5,271,232
[45] Date of Patent: Dec. 21, 1993

[54] FILTRATION APPARATUS

[75] Inventors: Takashi Ogawa, Chiba; Toshiro Minami, Hadano, both of Japan

[73] Assignee: Toshiba Ceramics Co., Ltd., Tokyo, Japan

[21] Appl. No.: 53,327

[22] Filed: Apr. 27, 1993

Related U.S. Application Data

[63] Continuation of Ser. No. 732,218, Jul. 19, 1991, abandoned.

[30] Foreign Application Priority Data

Jul. 20, 1990 [JP] Japan .................... 2-190630
Aug. 14, 1990 [JP] Japan .................... 2-213707

[51] Int. Cl.⁵ .................................... F17C 7/02
[52] U.S. Cl. ............................. 62/50.1; 62/85; 62/475
[58] Field of Search ............... 62/50.1, 85, 474, 475, 62/46.1

[56] References Cited

U.S. PATENT DOCUMENTS

| | | | |
|---|---|---|---|
| 4,336,689 | 6/1982 | Davis | 62/50.1 |
| 4,586,343 | 5/1986 | Buschkens et al. | 62/50.1 |
| 4,863,617 | 9/1989 | Katoh et al. | 210/788 |
| 4,902,314 | 2/1990 | Mizukami et al. | 55/97 |
| 5,027,642 | 7/1991 | Wen et al. | 62/85 |

*Primary Examiner*—Ronald C. Capossela
*Attorney, Agent, or Firm*—Foley & Lardner

[57] ABSTRACT

A ceramic filter containing low humidity is applied to a process for filtering of liquid nitrogen without employing a vaporizing step. An apparatus is provided for carrying out the process and includes a filter device of a ceramic filter containing relatively low humidity and having specific pore diameters and pressure regulators on both sides of the filter.

14 Claims, 3 Drawing Sheets

FILTRATION APPARATUS

This application is a continuation of application Ser. No. 07/732,218, filed Jul. 19, 1991, now abandoned.

BACKGROUND OF THE INVENTION

This invention relates to a process for separating solid particles from liquid nitrogen, as well as to an apparatus for carrying out the process and also relates to a refrigerator including the apparatus.

Liquid nitrogen is used to freeze or cool some kind of medicines or foods. Normally, crude liquid nitrogen contains undesirable impurities, i.e., various potentially deadly germs and other undesirable particles of various sizes. Therefore, liquid nitrogen for such special use should be purified.

Endotoxin is regarded to the smallest particle among the undesirable impurities. Endotoxin comprises mainly lipoic-polysaccharide which is a main component of the cell membrane of gram-negative bacteria. The "gram-negative" bacteria indicates bacteria which shows a red color after Gram's stain classification method. If a medical procedure, such as a blood transfusion, injection, or an intravenous drip is contaminated with endotoxin, the endotoxin may cause fever or shock as a harmful side effect. The endotoxin is also known to be a representative pyrogen (a material which causes fever when it is introduced into a patient's body). It is important for the following points:

i) Air or water contains gram-negative bacteria at relatively higher concentrations than other bacteria. Thus, bacteria involving endotoxin is introduced to the patient with relatively high probability.

ii) Endotoxin causes fever even with a very small quantity. The concentration limit for a patient is 1 nanogram per kilogram (ng/kg) for intraveneous injection.

iii) Even if the body of bacteria is destroyed or the medical apparatus is sterilized, the activity of endotoxin is not reduced.

iv) Endotoxin is relatively stable against heat.

Thus, it is desirable to remove undesirable impurities, such as endotoxin, from liquid nitrogen ($-196°$ C.). Generally, the removing process includes vaporizing liquid nitrogen, filtering the nitrogen gas with an organic film filter device and re-liquefying the nitrogen gas into liquid. The filtrated liquid nitrogen can be used to freeze or cool medicines or foods.

Since in the conventional methods of removing impurities, the liquid nitrogen is first vaporized into a gas and then re-liquified, filtration of liquid nitrogen is expensive and also inefficient from industrial point of view.

In addition, the organic film filter is inferior in chemical resistance, mechanical strength and lasting quality. It is thus desirable to provide, a process and an apparatus which can filtrate nitrogen while in the liquid state without vaporization.

SUMMARY OF THE INVENTION

It is an object of the present invention to provide an improved process for filtering liquid nitrogen without complex apparatus.

It is another object of the present invention to provide an apparatus for carrying out the process.

Another object of the invention resides in the provision of a refrigerator including the apparatus which can filter liquid nitrogen without vaporiztion and re-liquification, whereby the refrigerator can decrease greatly the cost of filtration.

The invention may be characterized as a process for filtering liquid nitrogen comprising the steps of providing the liquid nitrogen to be filtered; providing a filter device comprising a ceramic filter containing humidity up to 0.05 percent by weight; cooling the ceramic filter by passing vaporized nitrogen gas from said liquid into the ceramic filter; and filtering the liquid nitrogen while maintaining the liquid nitrogen in a liquid state.

The invention may also be characterized as an apparatus for filtering liquid nitrogen comprising: a container for storing the liquid nitrogen; a filter device comprising a ceramic filter including a filtration layer, the average pore diameter of the filtration layer being from 0.05 micron to 1.0 micron, the ceramic filter containing humidity up to 0.05 percent by weight; a source valve provided between the container and the filter device; a first pressure regulator disposed between the valve and the filter device; and a second pressure regulator placed downstream of the filter device.

The invention may also be characterized as a refrigerator apparatus for freezing or cooling articles by sprinkling liquid nitrogen onto the articles through a nozzle disposed in a refrigerator body comprising a container for storing the liquid nitrogen; a filter device comprising a ceramic filter including a filtration layer, the average pore diameter of the filtration layer being from 0.05 micron to 1.0 micron, the ceramic filter containing humidity up to 0.05 percent by weight; a valve provided between the container and the filter device; a first pressure regulator disposed between the valve and the filter device; a second pressure regulator placed downstream of the filter device and a flow control apparatus comprising a thermometer, a control box connected to the thermometer for providing a control signal in response to the temperature measured by the thermometer, and a control valve connected between the filter device and the refrigerator body for controlling flow of liquid nitrogen in response to the control signal.

BRIEF DESCRIPTION OF THE DRAWINGS

The objects and features of the present invention may be understood with reference to the following detailed description of an illustrative embodiment of the invention, taken together with the accompanying drawings in which.

DETAILED DESCRIPTION OF THE PREFERRED EMBODIMENTS

Figure 1:
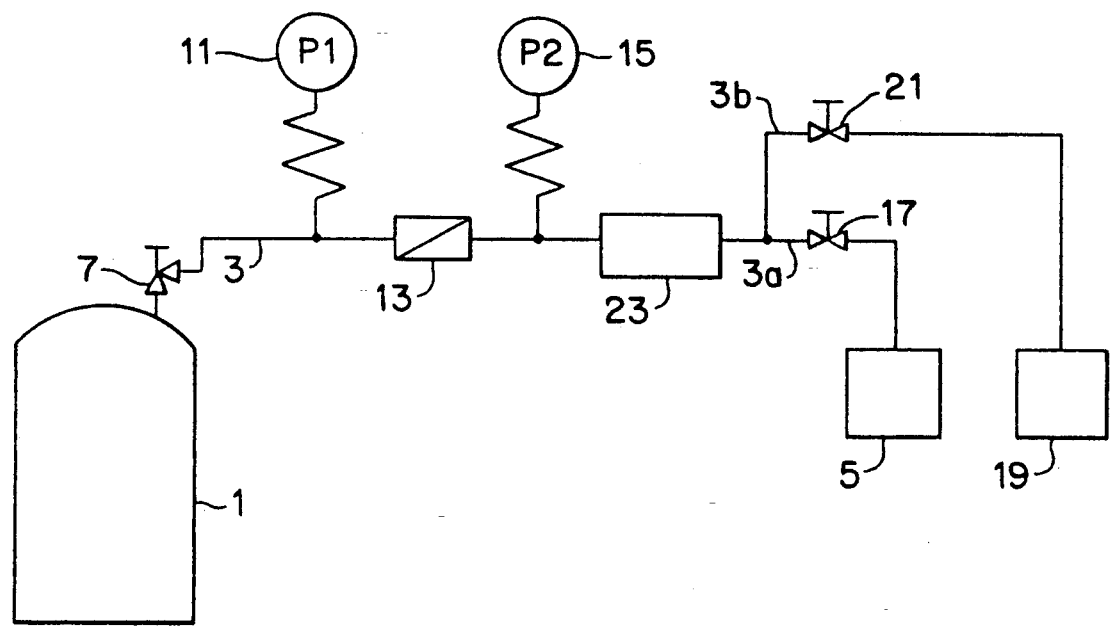
FIG. 1 is a schematic diagram showing a process and an apparatus for filtering liquid nitrogen according to the invention.

In FIG. 1, a bomb 1 as a container storing liquid nitrogen is connected to a refrigerator 5 through pipeline 3. The bomb can be replaced by a tank. Source valve 7, first pressure regulator 11, filter device 13, second pressure regulator 15, and particle counter 23 are disposed in the pipeline 3 as shown. Behind the particle counter 23, the pipeline 3 is divided into two pipelines 3a, 3b. One pipeline 3b reaches to the draining port through a safety valve 21. The safety valve 21 is usually closed, but it opens automatically, such as in case that the pressure exceeds the safety limit, so that the gas and/or liquid nitrogen can be exhausted to the drainage port 19. The other pipeline 3a is connected to the refrigerator 5 through a control valve 17.

In normal operation, the source valve 7 and the control valve 17 are opened but the safety valve 21 is closed. Liquid nitrogen is sent trough the pipeline 3 to the refrigerator by the internal pressure of the bomb 1. Liquid nitrogen is filtered in the filter device 13.

The filter device comprises a casing made of stainless steel (SUS) enclosing a ceramic filter. The structure of the filter device is described in detail in U.S. Pat. No. 4,902,314, issued Feb. 20, 1990 to Mizukami et al. While the Mizukami filter is disclosed for filtering gaseous nitrogen, it has been found in accordance with the invention that the same type of filter may be used for filtering liquid nitrogen. The filter device includes exchangeable single or multiple ceramic filters. According to the invention, the ceramic filter preferably has a filtration layer having pore size from 20 angstrom (Å) to 1.0 micron meter ($\mu$m). Preferably, the ceramic filter is made of alumina, zirconia, or quartz glass. These materials may be obtained in high purity and are rugged and long wearing. Further, more preferably, the ceramic filter has a three-layer construction and the diameter of each pore of the first layer is from about 10 to about 15 $\mu$m, that of the second layer is about 0.2 to about 1.0 $\mu$m, and that of the third layer which works as the filtration layer is from 40 Å to 0.5 $\mu$m. Liquid nitrogen is filtered by passing from filtration layer to the other more coarse pore layers.

In accordance with the invention, the ceramic filter having a humidity less than 0.05 percent by weight is used. Preferably, the ceramic filter was subjected to heat treatment of more than 100° C. and preferably at about 200° C. under vacuum for several hours to decrease the humidity content. In general, ordinary ceramic products contain humidity of around or less than 0.2 percent by weight. With humidity in excess of 0.05%, the humidity within the ceramic forms ice, and it may break the filtration layer due to volume expansion. Further, the ice particles may clog the filtration layer. According to the inventive process, it is necessary to first introduce cold nitrogen gas into the filter device to avoid the foregoing defects.

Alternatively, a cross-flow filtration system such as that shown in U.S. Pat. No. 4,863,617 can be used instead of the whole amount filtration system described above in this embodiment.

EXAMPLE 1 (COMPARATIVE)

Liquid nitrogen was supplied from bomb 1 to a vaporizer (not shown) which takes the place of the refrigerator 5. Further, the filter device 13 is omitted in order to determine the amount of particles contained in crude (unfiltered) liquid nitrogen. Since the flow rate of liquid nitrogen is difficult to measure, the flow rate of the nitrogen gas is measured after the liquid has vaporized in the vaporizer. The measurement takes place at 21° C. under 1 atmosphere pressure.

In example 1, the distribution of particles, the assumed amount (weight) of liquid nitrogen and the average pressure values, P1 at pressure regulator 11 and P2 at regulator 15, are measured each 5 minutes in sequence with the indicated flow rate. The results are shown in Table 1. The assumed amount (weight) was measured by calculating the difference in weight of the bomb 1 just before and after each 5 minutes. The particle counter 23 measures the number of particles by taking samples of liquid nitrogen, each sample being 0.228 $Nm^3$ per hour ($Nm^3/h$). This particle counter 23 is well known and commerically available and works by vaporizing a part of the liquid nitrogen (0.228 $Nm^3/h$) so as to measure, the particles found in the vapor. Within particle counter 23, the nitrogen liquid is vaporized to nitrogen gas at 21.1° C. under pressure of 1 atmosphere (atm) during 5 minutes. "N" of the unit "$Nm^3/h$" indicates the flow amount was measured under normal pressure (1 atm).

EXAMPLE 2 (COMPARATIVE)

An experiment was carried out on the same apparatus as in example 1, adding the filter device 13 but this time using nitrogen gas. The indicated amount of cold gaseous nitrogen (nominally around −110° C. at the outer surface of the casing of filter device 13) was filtered with an alumina ceramic filter having an average pore diameter of the filtration layer of 0.1 $\mu$m. The filter was initially heated under vacuum to reduce the humidity so as not to exceed 0.05% by weight. The results are shown in Table 2.

EXAMPLE 3 (PRESENT INVENTION)

After passing cold gaseous nitrogen (−100° C. at the outer surface of the casing of filter device 13) through the ceramic filter for 30 seconds to initially cool the filter, the indicated amount of liquid nitrogen (−160° C. at the outer surface of the casing of filter device 13) was filtered with the same apparatus as in example 2 and under the same low humidity filter characteristic (0.05% by weight). The results are shown in Table 3.

TABLE 1

| Flow Rate $Nm^3/h$ | Assumed Amount of Liquid Nitrogen kg/5 min. | Average Pressure $kg/cm^2$ | | Distribution of Particles Diameter (Counted Number) | | | | | | | Notes |
|---|---|---|---|---|---|---|---|---|---|---|---|
| | | $P_1$ | $P_2$ | 0.1 $\mu$m | 0.2 $\mu$m | 0.3 $\mu$m | 0.4 $\mu$m | 0.5 $\mu$m | 1.0 $\mu$m | Total | |
| 3.8 + 0.228 | 0.55 | 5.90 | 5.82 | 1049 | 268 | 27 | 19 | 13 | 0 | 1376 | |
| | 0.45 | 5.80 | 5.80 | 622 | 190 | 18 | 6 | 7 | 2 | 845 | |
| | 0.40 | 5.72 | 5.70 | 1132 | 317 | 22 | 9 | 13 | 4 | 1497 | |
| | 0.50 | 5.62 | 5.62 | 814 | 200 | 11 | 2 | 4 | 3 | 1034 | |
| | 0.45 | 5.59 | 5.59 | 540 | 140 | 6 | 1 | 2 | 0 | 689 | ○ |
| | 0.50 | 5.50 | 5.50 | 633 | 199 | 7 | 1 | 0 | 0 | 840 | ○ |
| | 0.45 | 5.42 | 5.42 | 466 | 120 | 5 | 2 | 0 | 0 | 593 | ○ |
| | 0.45 | 5.38 | 5.38 | 376 | 104 | 2 | 1 | 0 | 0 | 483 | ○ |
| | 0.50 | 5.30 | 5.30 | 443 | 91 | 3 | 3 | 3 | 1 | 544 | ○ |
| | (0.47*1) | | | 492 | 131 | 5 | 2 | 1 | 0 | 631) | |
| 7.6 + 0.228 | 1.25 | 5.12 | 5.12 | 1389 | 348 | 26 | 8 | 10 | 3 | 1784 | |
| | 1.15 | 5.00 | 5.00 | 1594 | 409 | 26 | 8 | 36 | 2 | 2075 | |
| | 1.25 | 4.92 | 4.92 | 1171 | 288 | 15 | 4 | 4 | 2 | 1484 | + |
| | 1.25 | 4.80 | 4.80 | 1144 | 263 | 16 | 11 | 4 | 1 | 1439 | + |

TABLE 1-continued

| Flow Rate Nm³/h | Assumed Amount of Liquid Nitrogen kg/5 min. | Average Pressure kg/cm² P₁ | P₂ | Distribution of Particles Diameter (Counted Number) 0.1 μm | 0.2 μm | 0.3 μm | 0.4 μm | 0.5 μm | 1.0 μm | Total | Notes |
|---|---|---|---|---|---|---|---|---|---|---|---|
| | 1.05 | 4.70 | 4.72 | 965 | 275 | 11 | 4 | 4 | 0 | 1259 | + |
| | 1.05 | 4.62 | 4.63 | 1712 | 409 | 21 | 10 | 5 | 1 | 2158 | |
| | 1.25 | 4.58 | 4.60 | 1207 | 278 | 19 | 2 | 3 | 2 | 1511 | + |
| | 1.20 | 4.50 | 4.52 | 1433 | 341 | 14 | 7 | 6 | 0 | 1801 | + |
| | (1.20*²  | | | 1184 | 289 | 15 | 6 | 4 | 1 | 1499) | |

*¹Average of measurements indicated with ∘ in the Notes column
*²Average of measurements indicated with + in the Notes column

TABLE 2

| Flow Rate Nm³/h | Assumed Amount of Liquid Nitrogen kg/5 min. | Average Pressure kg/cm² P₁ | P₂ | Distribution of Particles Diameter (Counted Number) 0.1 μm | 0.2 μm | 0.3 μm | 0.4 μm | 0.5 μm | 1.0 μm | Total | Notes |
|---|---|---|---|---|---|---|---|---|---|---|---|
| 3.8 + 0.228 | 0.55 | 9.40 | 8.82 | 29 | 3 | 1 | 0 | 2 | 0 | 35 | Temp at outer surface of filter casing −108° C. |
| | 0.45 | 9.02 | 8.50 | 14 | 5 | 0 | 0 | 0 | 0 | 19 | |
| | 0.55 | 8.62 | 8.20 | 21 | 2 | 1 | 0 | 0 | 0 | 24 | |
| | 0.55 | 8.22 | 7.80 | 7 | 2 | 0 | 0 | 0 | 0 | 9 | |
| | 0.40 | 7.90 | 7.50 | 11 | 0 | 0 | 0 | 0 | 0 | 11 | |
| | 0.45 | 7.58 | 7.20 | 7 | 0 | 0 | 0 | 0 | 0 | 7 | |
| | 0.45 | 7.20 | 6.82 | 14 | 1 | 0 | 0 | 1 | 0 | 16 | |
| | 0.50 | 6.90 | 6.58 | 7 | 0 | 0 | 0 | 0 | 0 | 7 | |
| | 0.45 | 6.58 | 6.22 | 8 | 1 | 0 | 0 | 0 | 0 | 9 | |
| | (0.48 | | | 13 | 2 | 0 | 0 | 0 | 0 | 15) | |
| 3.8 + 0.228 | 0.70 | 4.85 | | 4 | 0 | 0 | 0 | 0 | 0 | 4 | Average of foregoing rows −122° C. |
| | 0.50 | 4.25 | | 1 | 0 | 0 | 0 | 0 | 0 | 1 | |
| 7.6 + 0.228 | 1.05 | 2.70 | | 5 | 0 | 3 | 1 | 0 | 0 | 9 | |

TABLE 3

| Flow Rate Nm³/h | Assumed Rate of Liquid Nitrogen kg/5 min. | Average Pressure kg/cm² P₁ | P₂ | Distribution of Particles Diameter (Counted Number) 0.1 μm | 0.2 μm | 0.3 μm | 0.4 μm | 0.5 μm | 1.0 μm | Total | Notes |
|---|---|---|---|---|---|---|---|---|---|---|---|
| 3.8 + 0.228 | 0.40 | 6.58 | 6.30 | 250 | 6 | 0 | 0 | 0 | 1 | 257 | Temp at outer surface of filter casing −160° C. |
| | 0.40 | 6.55 | 6.30 | 100 | 13 | 3 | 2 | 5 | — 2 | 125 | |
| | 0.40 | 6.52 | 6.32 | 27 | 9 | 0 | 0 | 1 | 1 | 38 | |
| | 0.45 | 6.50 | 6.32 | 0 | 0 | 0 | 0 | 0 | 0 | 0 | |
| | 0.45 | 6.48 | 6.30 | 4 | 0 | 0 | 0 | 1 | 0 | 5 | |
| | 0.50 | 6.45 | 6.30 | 6 | 1 | 0 | 0 | 0 | 0 | 7 | |
| 7.6 + 0.228 | 1.20 | 6.30 | 6.00 | 673 | 38 | 6 | 1 | 3 | 2 | 723 | −165° C. |
| | 1.15 | 6.25 | 5.90 | 34 | 5 | 2 | 0 | 0 | 0 | 41 | |
| | 1.20 | 6.22 | 5.85 | 13 | 2 | 0 | 0 | 0 | 1 | 16 | |
| 11.4 + 0.228 | 1.45 | 6.08 | 5.65 | 61 | 9 | 4 | 2 | 1 | 1 | 78 | −172° C. |
| | 1.45 | 6.01 | 5.60 | 3 | 1 | 0 | 0 | 0 | 0 | 4 | |
| | 1.40 | 6.00 | 5.60 | 8 | 1 | 0 | 0 | 0 | 0 | 9 | |
| 3.8 + 0.228 | 0.55 | 6.00 | 5.82 | 5 | 0 | 0 | 0 | 0 | 0 | 5 | −160° C. |
| | 0.50 | 6.00 | 5.82 | 11 | 1 | 1 | 0 | 1 | 0 | 14 | |
| | 0.45 | 5.98 | 5.80 | 0 | 0 | 0 | 0 | 0 | 0 | 0 | |
| 7.6 + 0.228 | 1.00 | 5.82 | 5.50 | 292 | 5 | 1 | 1 | 1 | 1 | 301 | −160° C. |
| | 1.25 | 5.80 | 5.48 | 1 | 2 | 0 | 0 | 1 | 0 | 4 | |
| 3.8 + 0.228 | 0.65 | 5.58 | Not Measured | 0 | 0 | 1 | 0 | 0 | 0 | 1 | −160° C. |
| | 0.50 | 5.55 | | 3 | 0 | 0 | 0 | 0 | 0 | 3 | |
| 7.6 + 0.228 | 0.95 | 5.42 | Not Measured | 297 | 4 | 0 | 0 | 0 | 0 | 0 | −162° C. |
| | 1.20 | 5.40 | | 11 | 2 | 0 | 0 | 0 | 0 | 0 | |
| | 1.10 | 5.35 | | 1 | 0 | 0 | 0 | 0 | 0 | 0 | |

It is observed that in example 1 and Table 1 (without filtrating), the unfiltered liquid nitrogen contains about 600 particles, mainly ranging in diameter from 0.1 μm to 0.3 μm at the stabled liquid flow rate of 3.8+0.228 Nm³/h. With about twice the flow rate, at 7.6+0.228 Nm³/h, about twice the amount of particles were counted at the particle counter 23.

In example 2 and Table 2, because gaseous nitrogen was filtrated by the filter device, the amount of particles counted after filtration was decreased and only a few particles smaller than 0.3 μm in diameter were counted. Although the flow rate was increased, the amount of particles was not increased.

In example 3 and Table 3, because liquid nitrogen was filtered by the filter device 13, the amount of particles was decreased compared with example 1. When the flow rate of liquid nitrogen was increased, for example increased from 3.8+0.228 to 7.6+0.228 Nm³/h, the amount of particles was also increased temporary. But after 5 of 10 minutes, the amount of particles became stable at a relatively low level. In the case when the flow rate of nitrogen was decreased, the amount of particles remained stable at a low level.

Through studying these examples, it is obvious that the ceramic filter can be applied to filtration of liquid state nitrogen (−196° C.) as well as gaseous state nitrogen without filter deformation, breaking or clogging. The ceramic filter having a pore size of its filtration layer of about 0.1 μm can trap more than 95% of particles included in the crude liquid nitrogen under stable conditions.

Figure 2:
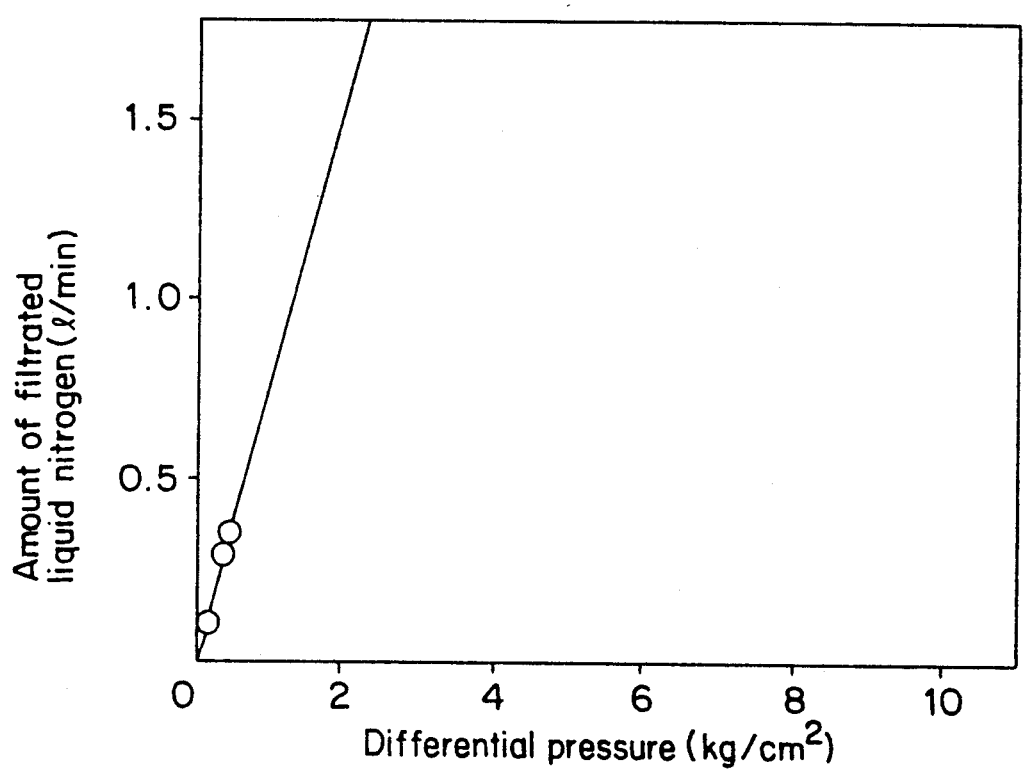
FIG. 2 is a graph showing a relationship between the amount of filtrated liquid nitrogen and differential pressure.

As may be calculated from Table 3, the average amount of filtered liquid nitrogen (liter per hour) and average differential pressure ($P_1-P_2$ kg/cm$^2$) per unit area of the ceramic filter is as shown in Table 4 and in the graph of FIG. 2. The conversion from (kg/hour) to (l/hour) is estimated based on the density of liquid nitrogen of 0.804 kg/l at 78.1° K.

TABLE 4

| Flow Rate (Nm$^3$/h) | Amount of Filtrated Liquid Nitrogen | | Average Differential Pressure ($P_1-P_2$) (kg/cm$^2$) |
|---|---|---|---|
| | (kg/h) | (l/h) | |
| 3.8 + 0.228 | 5.4 | 6.7 | 0.174 |
| 7.6 + 0.228 | 13.9 | 17.3 | 0.342 |
| 11.4 + 0.228 | 17.2 | 21.4 | 0.413 |

It is found from FIG. 2 that a ceramic filter having a pore size of about 0.1 μm in its filtration layer and a filtration area of 0.007 m$^2$ can filter 1 l/min. of liquid nitrogen under a condition of average differential pressure of about 1.5 kg/cm$^2$. This amount is satisfactory for industrial use.

Figure 3:
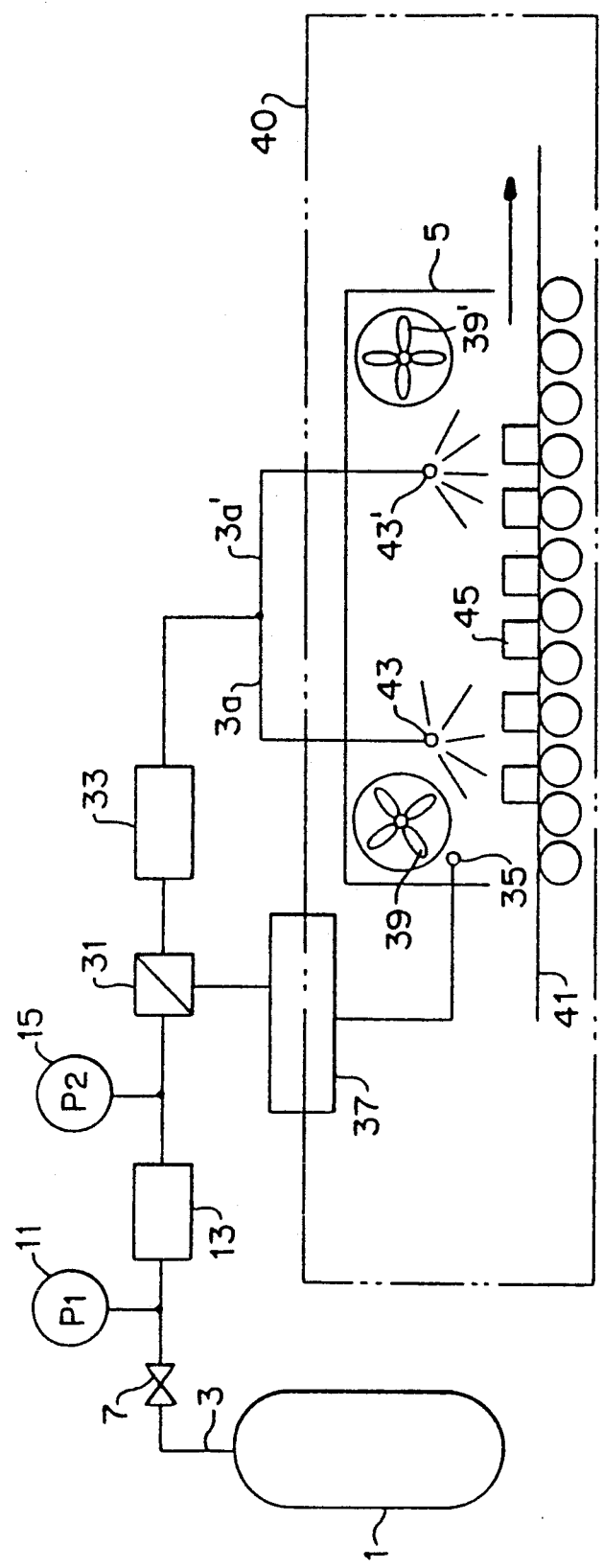
FIG. 3 is a schematic diagram showing a refrigerator according to the invention.

FIG. 3 shows a refrigerator according to the invention including an apparatus for filtering liquid nitrogen. In FIG. 3, the same element in FIG. 1 is designated with the same number. A bomb 1 such as a container for storing liquid nitrogen is connected to nozzles 43, 43' inside of refrigerator body 5 through the pipeline 3. Source valve 7, first pressure regulator 11, first filter device 13, second pressure regulator 15, electric flow control valve 31, and second filter device 33 are disposed in the pipeline 3 as shown. Behind the second filter device 33, the pipeline 3 is divided into multiple branch pipeline 3a, 3a'. Branch pipeline 3a, 3a' terminates with nozzle 43, 43' disposed inside of refrigerator body 5. Heat insulation material (not shown) surrounds the entire outer surface of each pipeline 3, 3a, 3a'.

Plural thermometers 35 (only one shown in FIG. 3) are arranged inside of the refrigerator body 5. The electric flow control valve 31 and the thermometers 35 are electrically connected to a control apparatus 37. The control apparatus 37 controls the electric valve 31 according to the temperature detected by the thermometers 35 so as to keep the temperature inside of the refrigerator body 5 stable at predetermined suitable temperature.

Fans 39, 39' are provided on the inside wall of the refrigerator body 5 to achieve a homogeneous temperature distribution.

In actual use, the source valve 7 and the electric valve 31 are opened. Liquid nitrogen is send trough the pipelines 3, 3a, 3a' to the nozzles 43, 43' by the internal pressure of the bomb 1. Liquid nitrogen is filtrated through the first filter device 13 and the second filter device 33.

As the first and the second filter devices of this refrigerator, an alumina filter is used having the same properties as the filter in the apparatus of FIG. 1.

The second filter device 33 is provided to remove the particles generated by switching of the electric valve and to minimize the particles which passed the first filter device particularly when the flow amount of liquid nitrogen is increased, as observed in foregoing example 3. If desired, the second filter device 33 can be omitted.

The articles 45 subjected to refrigerate are brought into the refrigerator body by a belt conveyer 41 with a predetermined speed. The articles 45 are refrigerated while passing through the refrigerator body 5 and moved to the next operation.

The refrigerator body 5 and the article handling equipment are positioned in a clean room 40.

The above-described refrigerator according to the invention may refrigerate articles without contamination of particles which would otherwise be included in the liquid nitrogen. Additionally, since the refrigerator filters nitrogen in the liquid state, it saves the high expense otherwise needed for vaporizing and re-liquefying the nitrogen.

The foregoing description has been set forth merely to illustrate the invention and is not intended to be limiting. Since modifications of the described embodiments incorporating the spirit and substance of the invention may occur to persons skilled in the art, the scope of the invention should be construed to cover all variations falling within the appended claims and equivalents.

What is claimed is:

1. A process for filtering liquid nitrogen comprising the steps of:
   providing said liquid nitrogen to be filtered;
   providing a filter device comprising a ceramic filter containing humidity not exceeding 0.05 percent by weight;
   cooling the ceramic filter by passing vaporized nitrogen gas from said liquid nitrogen into the ceramic filter; and
   filtering the liquid nitrogen with the ceramic filter while maintaining the liquid nitrogen in a liquid state.

2. A process according to claim 1, wherein the filter device providing step includes the step of heating the ceramic filter more than 100° C.

3. A process according to claim 1, wherein the filter device providing step includes the step of choosing ceramic filter made of alumina.

4. A process according to claim 1, wherein the filter device providing step includes the step of choosing ceramic filter made of zirconia.

5. A process according to claim 1, wherein the filter device providing step includes the step of choosing ceramic filter made of quartz glass.

6. An apparatus for filtering liquid nitrogen comprising:
   a container for storing said liquid nitrogen;
   a filter device comprising a ceramic filter including a filtration layer, the average pore diameter of the filtration layer being from 0.05 micron to 1.0 micron, the ceramic filter containing humidity up to 0.05 percent by weight;
   a source valve provided between the container and the filter device;
   first pressure regulator placed between the valve and the filter device; and
   second pressure regulator placed downstream of the filter device.

7. An apparatus according to claim 6, wherein the ceramic filter is made of alumina.

8. An apparatus according to claim 6, wherein the ceramic filter is made of zirconia.

9. An apparatus according to claim 6, wherein the ceramic filter is made of quartz glass.

10. A refrigerator apparatus for freezing or cooling articles by sprinkling liquid nitrogen onto the articles through a nozzle disposed in a refrigerator body comprising:
- a container for storing said liquid nitrogen;
- a first filter device comprising a first ceramic filter including a first filtration layer thereon, the average pore diameter of the first filtration layer being from 0.05 micron to 1.0 micron, the first ceramic filter containing humidity up to 0.05 percent by weight;
- a valve provided between the container and the filter device;
- first pressure regulator disposed between the valve and the filter device;
- second pressure regulator placed downstream of the filter device;
- a thermometer arranged to measure temperature inside of the refrigerator body;
- a control apparatus connected to the thermometer for providing a control signal in response to the temperature measured by the thermometer; and
- an electric flow control valve connected between the filter device and the refrigerator body for controlling flow of liquid nitrogen in response to the control signal from the control apparatus.

11. A refrigerator apparatus according to claim 10, further comprising a second filter device comprising a second ceramic filter including a second filtration layer, the average pore diameter of the second filtration layer being from 40 angstrom to 0.1 micron, the second ceramic filter having a humidity up to 0.05 percent by weight, said second filter device connected between the control valve and the refrigerator body.

12. An apparatus according to claim 10, wherein at least one of said first and second ceramic filters is made of alumina.

13. An apparatus according to claim 10, wherein at least one of said first and second ceramic filters is made of zirconia.

14. An apparatus according to claim 10, wherein at least one of said first and second ceramic filter is made of quartz glass.

* * * * *